United States Patent
Chen et al.

(10) Patent No.: US 6,817,523 B2
(45) Date of Patent: Nov. 16, 2004

(54) MEMORY CARD ADAPTER STRUCTURE

(76) Inventors: Andy Chen, Fl. 5, No. 15, Alley 19, Lane 22, Pao-Sheng Road, Yungho City, Taipei Hsien (TW); Lien-Won Lu, No. 117, Wan-Da Road, Yang-Mei Chen, TaoYuan Hsien (TW)

( * ) Notice: Subject to any disclaimer, the term of this patent is extended or adjusted under 35 U.S.C. 154(b) by 5 days.

(21) Appl. No.: 10/243,674

(22) Filed: Sep. 16, 2002

(65) Prior Publication Data

US 2004/0050934 A1 Mar. 18, 2004

(30) Foreign Application Priority Data

Jul. 2, 2002 (TW) ...................................... 91210002 U

(51) Int. Cl.$^7$ ................................................ G06K 7/06
(52) U.S. Cl. ...................................... 235/441; 439/260
(58) Field of Search ................................ 231/435, 439, 231/441; 439/260, 483, 489, 630; 361/737

(56) References Cited

U.S. PATENT DOCUMENTS

| | | | | |
|---|---|---|---|---|
| 5,334,827 A | * | 8/1994 | Bleier et al. ................. | 235/441 |
| 5,599,203 A | * | 2/1997 | Broschard, III ............. | 439/489 |
| 5,667,408 A | * | 9/1997 | Broschard et al. .......... | 439/630 |
| 5,837,984 A | * | 11/1998 | Bleier et al. ................. | 235/441 |
| 6,122,175 A | * | 9/2000 | Shieh .......................... | 361/737 |
| 6,135,809 A | * | 10/2000 | Asakawa ..................... | 439/489 |
| 6,234,391 B1 | * | 5/2001 | Reichardt et al. ........... | 235/441 |
| 6,315,205 B1 | * | 11/2001 | Bates, III .................... | 235/441 |
| 6,398,111 B2 | * | 6/2002 | Reichardt et al. ........... | 235/441 |
| 6,612,492 B1 | * | 9/2003 | Yen ............................. | 235/451 |
| 6,623,304 B2 | * | 9/2003 | Harasawa et al. .......... | 439/630 |
| 6,663,007 B1 | * | 12/2003 | Sun et al. .................... | 235/441 |
| 6,700,788 B2 | * | 3/2004 | Matsushita et al. ......... | 361/737 |
| 2003/0235040 A1 | * | 12/2003 | Liu et al. .................... | 361/737 |
| 2004/0033722 A1 | * | 2/2004 | Liu et al. .................... | 439/630 |

FOREIGN PATENT DOCUMENTS

EP 1 104 907 A1 * 6/2001

* cited by examiner

Primary Examiner—Jared J. Fureman

(57) ABSTRACT

The present invention discloses a memory card adapter structure, comprising a main body and a baseboard. The main body is overlapped on the baseboard and has a socket on one end. The socket can host different types of memory cards. There are multi PIN receptacles in the socket. On the baseboard, there is a containing hole against the PIN receptacles on the main body. Furthermore, there is a connector at one side of the baseboard. When the main body is coupled with the baseboard, the PIN receptacles will enter into the containing hole, and then the PINs in the receptacle will contact with the baseboard to form a closed circuit. In this way, different memory cards can be connected to the adapter to transfer signals and data at different times.

6 Claims, 5 Drawing Sheets

MEMORY CARD ADAPTER STRUCTURE

FIELD OF THE INVENTION

The present invention discloses a memory card adapter structure to host different models or sizes of memory cards (i.e., Memory Stick Card, Multimedia Card, or Secure Digital Card) at different times. When the adapter is connected to a card driver, the card driver can access different types of memory cards. Such an adapter not only can improve the efficacy and total value of card drivers, but also enables simple processing of data in the baseboard, eliminating the cost and size augment due to an external board attached in traditional products.

BACKGROUND OF THE INVENTION

All memory card products (e.g., Multimedia Card, Memory Stick Card, or Secure Digital Card) available in the current market shall be connected to PC through corresponding card drivers to transfer data. Most card driver products, for the moment, are designed to work with specific memory cards. However, for customers, what is considered most in purchasing memory cards and card driver products are the price and functions. In order to make card driver products satisfy customers' demands better, some manufacturers add appropriate adapters to those card drivers, thus the card drivers can access multi types of memory cards, expanding their application scopes. However, though there are some memory card driver products that can access multi types of memory cards in the market, most of them are relatively expensive and are only suitable for specific card models or cards of the same size. That situation mainly results from the inappropriate assembly of adapters, higher cost and incomplete overall design of those card drivers. A crucial problem in those card drivers is that the contact PINs in the adapters can't be coupled accurately and easily with the memory cards, thus it results in degradation of signals in transmission and damage of card drivers. Therefore, if the PINs in the adapters can be coupled with the memory cards accurately and contact well, above shortcomings will disappear. And memory cards will be surely more popular in the market.

In addition, if the external baseboard can be embedded in the adapter before the adapter is installed, the size of the entire device will be more compact, and the cost will be decreased further. Such a device can better meet the trend of "light, thin, small and short" in today's world.

SUMMARY OF THE INVENTION

The main purpose of the present invention is to provide a signal adapter structure that supports multi types of memory cards through the combination of the main body and the baseboard with a connector. Such a device will surely be well accepted in the market.

The second purpose of the present invention is to facilitate the assembly of the device and decease the total cost through the combination of the main body and the baseboard. The signals can be transferred and processed through the baseboard. Such a design can not only increase signal quality, but also eliminate the external baseboard in traditional implementations, thus it can help to decrease the cost of the entire device and bring convenience to installation.

The third purpose of the present invention is to reduce the size of the adapter in the present invention through the combination of the main body and the baseboard, to better meet the industrial trend of "light, thin, short, and small".

| | |
|---|---|
| Signal Adapter | 1 |
| Main Body | 11 |
| Socket | 111 |
| PIN Receptacle | 112 |
| Baseboard | 12 |
| Containing Hole | 121 |
| Welding Hole | 122 |
| USB Socket | 123 |
| LED | 124 |
| PINs | 14 |
| Welding Plates of PINs | 141 |
| Memory Card | 2 |

DETAILED DESCRIPTION OF THE PREFERRED EMBODIMENT

The structure, purposes and features of the present invention are detailed further in the following embodiment.

Figure 1:
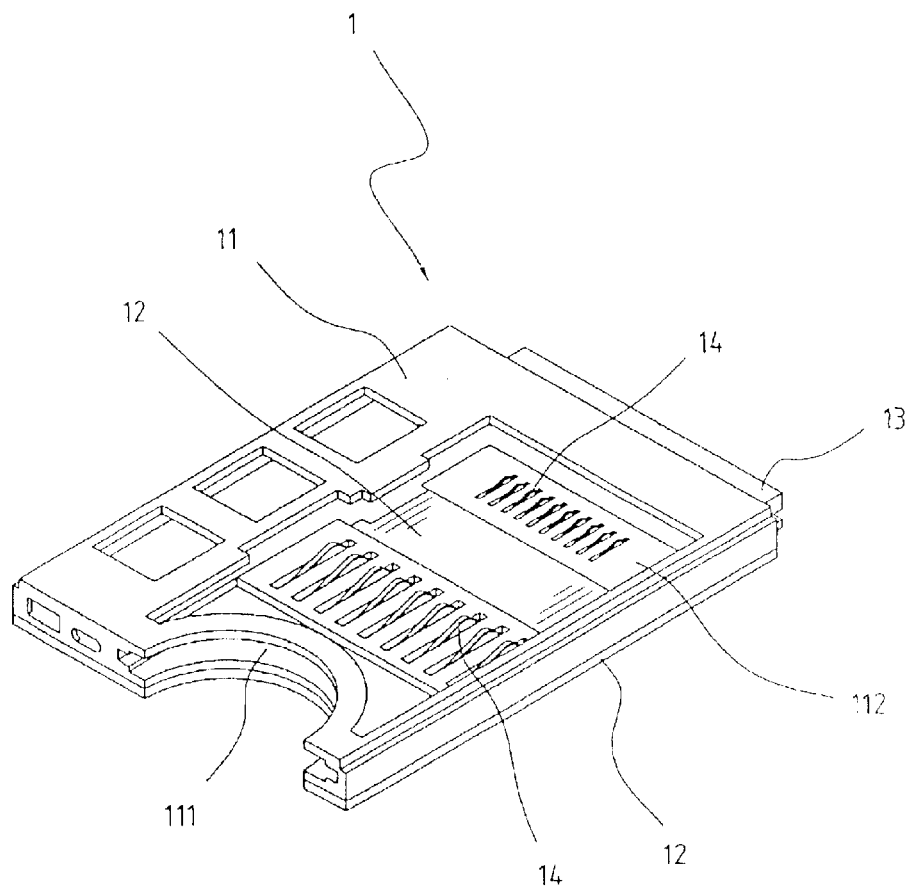
FIG. 1 is a 3D assembly view of the present invention.
Figure 2:
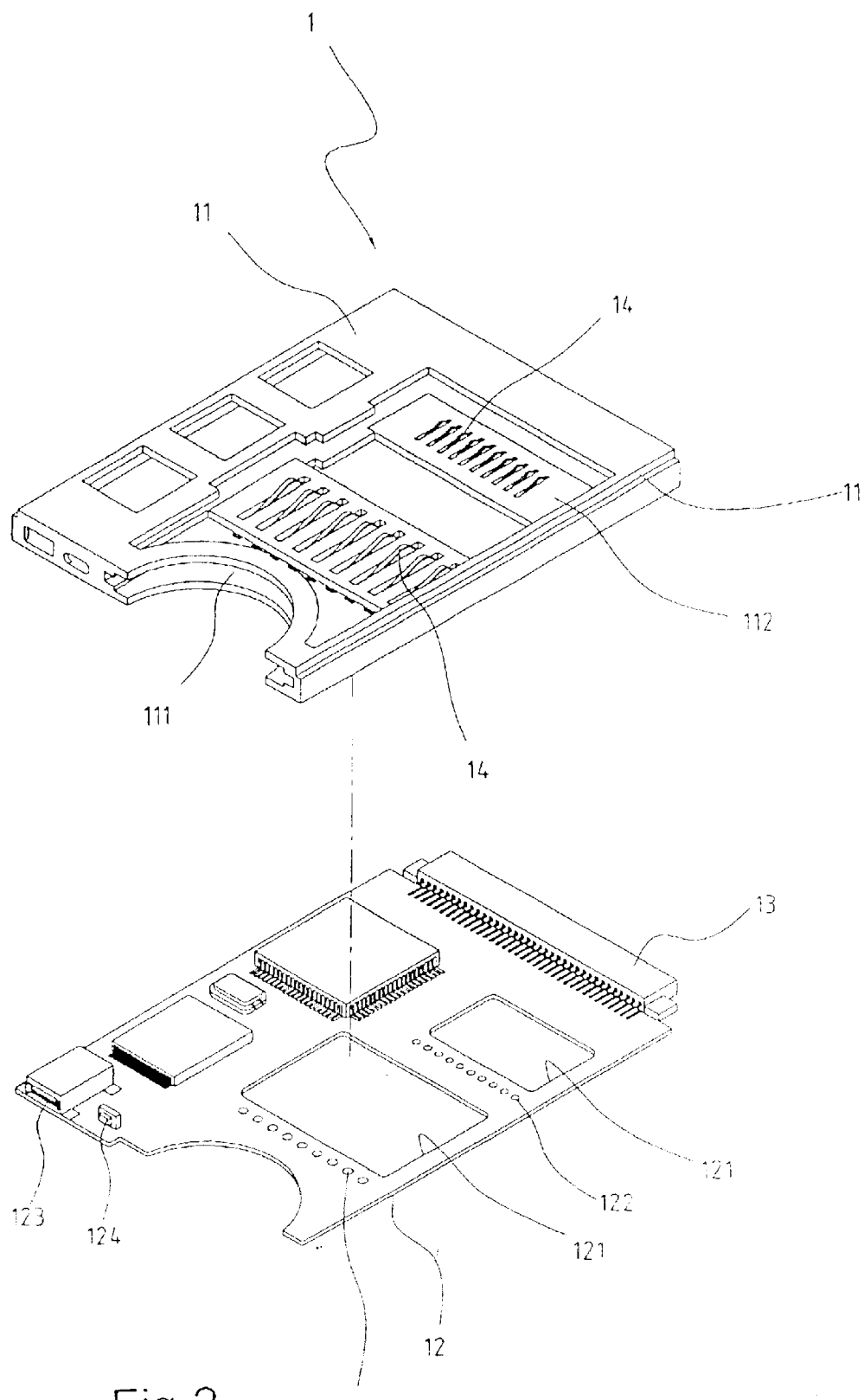
FIG. 2 is a 3D exploded view (1) of the present invention.
Figure 3:
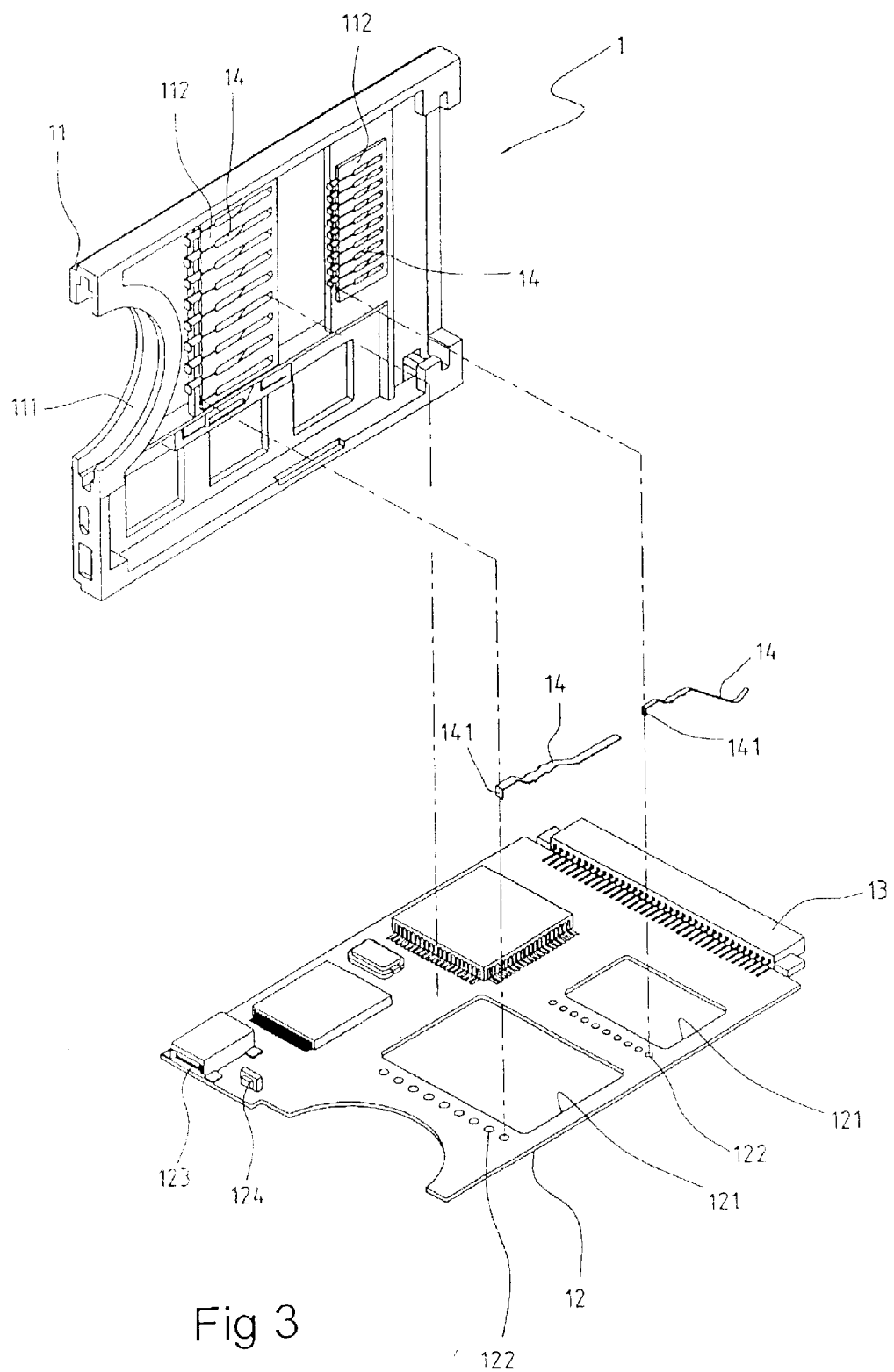
FIG. 3 is a 3D exploded view (2) of the present invention.

Please see FIG. 1, FIG. 2 and FIG. 3, a 3D assembly diagram and 3D exploded views (1) and (2) of an embodiment implemented according to the present invention. From the figures we can see that the invention is an improved memory card adapter structure 1 comprising a main body 11, a baseboard 12 and a connector 13. The main body 11 is overlapped on the baseboard 12, and the baseboard 12 is connected to the connector 13 on the end. There is a socket 111 at one side of the main body 11. The socket 111 can host different models or sizes of memory cards 2. When the main body 11 is coupled with the baseboard 12, the PIN receptacles 112 in the socket 111 on the main body 11 will enter into the containing hole 121 on the baseboard 12. (The said PIN receptacles protrude out of the bottom surface of the main body, thus when the main body is coupled with the baseboard, the PIN receptacles can enter into the containing hole on the baseboard.) Then, the contact PINs 14 of the PIN receptacles 112 will be connected to the baseboard 12 to conduct signals. And the top ends of PINs 14 extend into the socket 111 on the main body 11. When a memory card 2 is inserted into the socket 111 on the main body 11, the information in the memory card 2 can be transferred to the baseboard 12 through the contact terminals 14, and then be sent out through the connector 13. The coupling between the said contact PINs 14 and the baseboard 12 is implemented through inserting the welding plates 141 (reversed "L"-shape at the top end) of the contact PINs 14 into the holes 122 on the baseboard 12 and fixing the welding plates there by welding. To further improve the convenience of the adapter 1, a USB socket 123 and a LED 124 can be mounted on the baseboard 12, and the USB socket 123 and the LED 124 pass through the case of the main body 11. In this way, the user not only can utilize the power from the USB interface, but also be able to learn the status of the memory card adapter in the present invention through viewing the LED.

Figure 4:
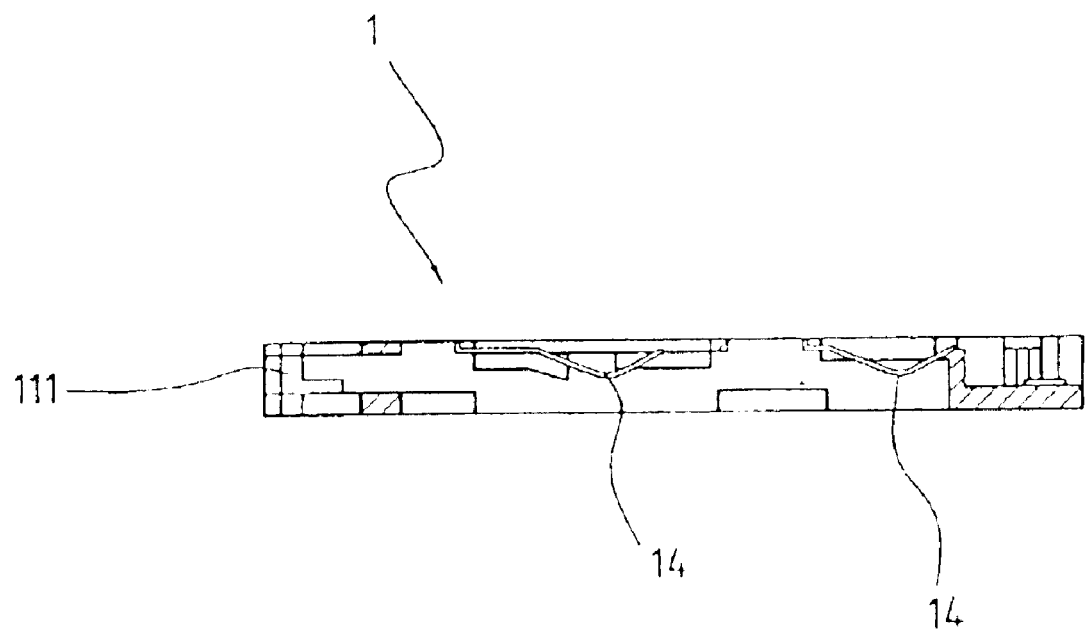
FIG. 4 is a sectional view of the present invention.

Please see FIG. 4, a sectional diagram of the embodiment implemented according to the present invention. From that figure we can see that the baseboard 12 is fixed under the main body 11, and the PIN receptacles 112 on the main body 11 can extend into the containing hole 121 of the baseboard 12. Then the PINs 14 in the receptacles 112 are welded onto the baseboard 12, and the top ends of PINs 14 extend into the socket 111 on the main body 11. In this way, when the memory card 2 is inserted into the socket 111 on the main body 11, the PINs 14 will be connected to the memory card 2. Now, the signals or data in the memory card 2 can be transferred to the baseboard through the PINs 14. Then the signals or data can be sent out from the connector 1. (Please see FIG. 2 and FIG. 3.)

Figure 5:
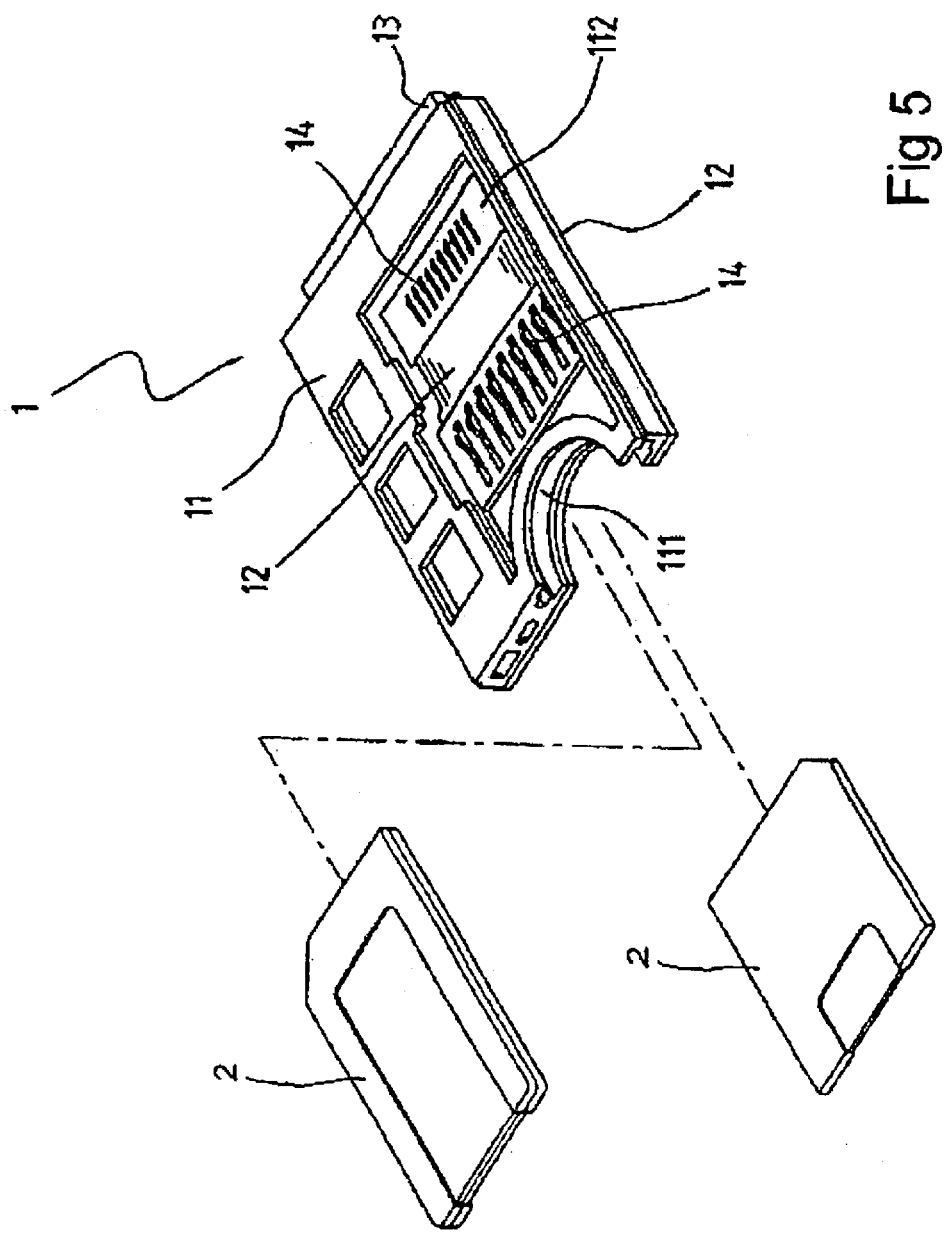
FIG. 5 is a sketch map of an embodiment implemented according to the present invention.

Please see FIG. 5, a sketch map of an embodiment of the present invention. The figure indicates that different models or sizes of memory cards 2 (Memory Stick Card, Multimedia Card, or Secure Digital Card) can be inserted into the socket 111 by the design. There are different PIN receptacles at the position where the socket 111 faces against the spring plates of memory card 2. Thus the PINs 14 on the receptacles 112 can effectively transfer the information stored in the memory card 2 to the baseboard 12.

What is claimed is:

1. A memory card signal adapter structure comprising:

a main body, wherein the main body has a socket for hosting memory cards, and has pin receptacles with a plurality of contact pins;

a baseboard, having containing holes through which the pin receptacles are respectively inserted wherein the main body is fixed on and coupled with the baseboard, and the pin receptacles are respectively inserted through the containing holes so that a memory card is located on and connected to all the contact pins when the memory card is inserted in the main body; and a connector, mounted and connected to the baseboard.

2. The memory card signal adapter structure of claim 1, wherein there are welding holes near said containing holes through said baseboard and the contact pins are welded in the respective welding holes.

3. The memory card signal adapter structure of claim 1, wherein said contact pins are welded on the baseboard.

4. The memory card signal adapter structure of claim 1, wherein a tip portion of each contact pin has a "L" shape.

5. The memory card signal adapter structure of claim 2, wherein reversed L-shaped tip portions of the contact pins are inserted into the welding holes of said baseboard.

6. The memory card signal adapter structure of claim 1, wherein an emitting diode can be mounted on said baseboard.

* * * * *